July 26, 1932.  W. J. PEELLE  1,868,990
GASKET FORMING MACHINE
Original Filed June 7, 1926
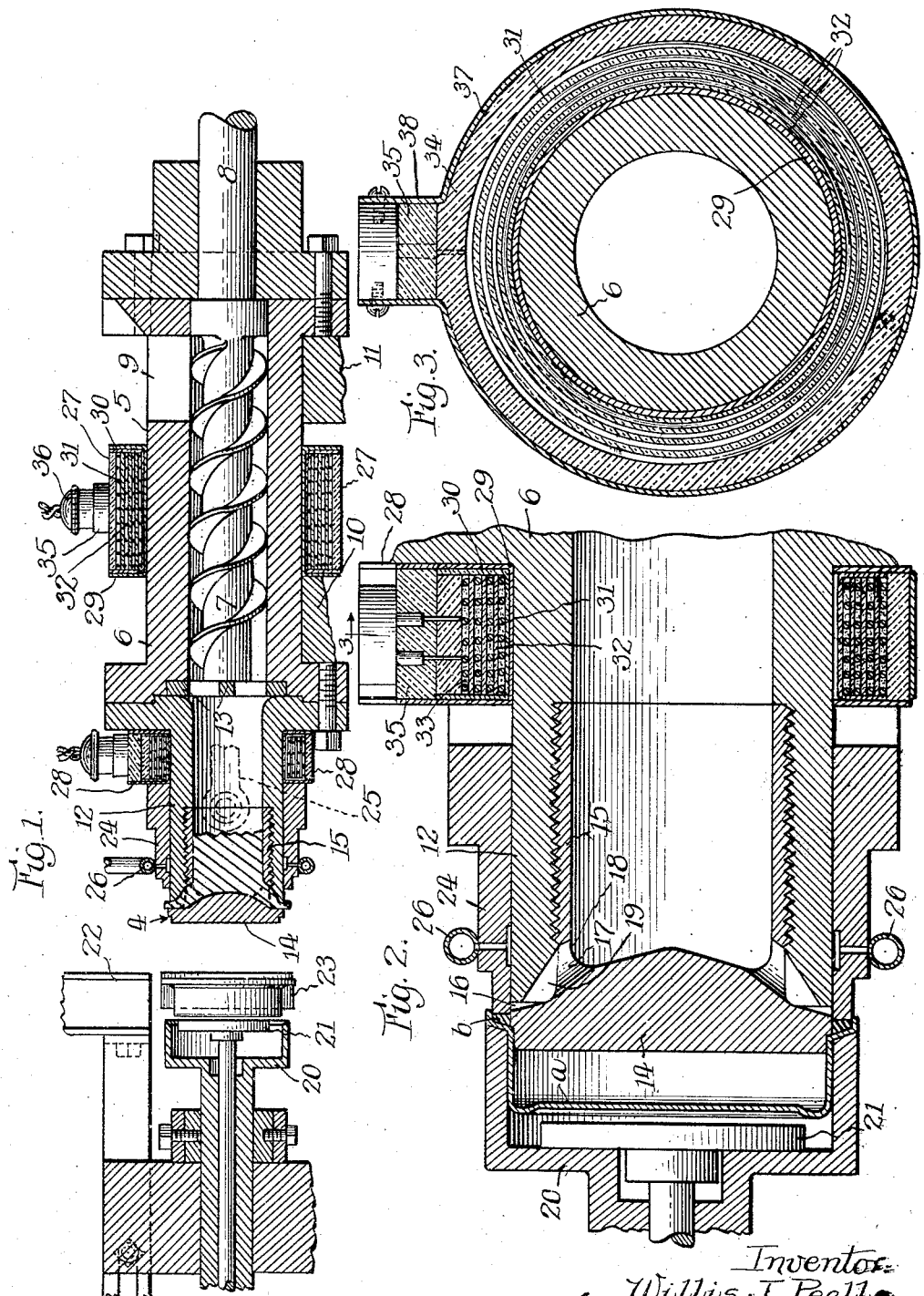

Patented July 26, 1932

1,868,990

UNITED STATES PATENT OFFICE

WILLIS J. PEELLE, OF CHICAGO, ILLINOIS

GASKET FORMING MACHINE

Original application filed June 7, 1926, Serial No. 114,224. Divided and this application filed February 28, 1929. Serial No. 343,433.

The invention relates to a machine for forming gaskets of raw rubber composition for application to jar caps or covers; and the primary object of the invention is to provide a novel and advantageous construction for insuring the extrusion of a ring or gasket which is of a uniform character throughout its circumference.

A further object is to provide for the effectual application of heat to the plastic material in a manner such as to insure a uniform flow of the material upon extrusion.

In the accompanying drawing I have illustrated a preferred embodiment of my invention, it being understood that it is contemplated that various changes in the construction and arrangement set forth may be made by those skilled in the art without departing from the spirit and scope of the invention as expressed in the appended claims.

Figure 1 is a fragmentary central vertical sectional view of a gasket-forming means embodying my invention.

Fig. 2 is a similar view showing certain of the parts of Fig. 1, but on a larger scale and in a different relation.

Fig. 3 is a transverse sectional view taken approximately in the plane of line 3—3 of Fig. 2.

The gasket-forming means selected for purposes of illustration constitutes a portion of a machine illustrated, described and claimed in my copending application Serial No. 114,224 (now Patent No. 1,722,763, dated July 30th, 1929) of which this application is a division. Briefly the gasket-forming means comprises a die 4 and a feeding means 5, the latter operating to supply plastic material to the die for extrusion therefrom.

The feeding means consists of a cylinder 6 equipped with a feed screw 7 which is arranged to be actuated through a suitable connection with a driven shaft 8. The cylinder 6 has an inlet opening 9 therein through which the plastic material may be introduced into the magazine. Stationary supports 10 and 11 are provided for opposite ends of the cylinder.

The die 4 comprises a tubular member 12 flanged and bolted to the forward end of the cylinder 6 in axial alinement therewith. A spider 13 is socketed in the forward end of the cylinder 6 and provides a bearing for the forward end of the feed screw. The tubular die member 12 thus communicates, through the spider, with the interior of the cylinder 6 to receive the plastic material as the latter is moved forwardly by the operation of the feed screw.

The tubular member 12 of the die constitutes one section of a two-part construction for the die. The other section is in the form of a core having a head 14 of a diameter equal to the diameter of the member 12 and having rigid therewith a sleeve 15 screw threaded into a counterbore in the forward end of the member 12. The head 14 is spaced forwardly from the adjacent end of the tubular member 12 so as to form a substantially radial extrusion slot 16 (Fig. 2). This slot opens outwardly from the outer cylindrical surface of the die formed by the two adjacent parts and is, of course, continuous throughout the entire circumference of the die. Communication between the interior of the die and the annular slot 16 is provided by means of a series of closely spaced ports 17 such ports leaving a plurality of metallic supporting members or webs 18 for the head; and preferably the forward end of the cylinder 18 is shaped to coact with the head outwardly of the port 17 to provide an annular chamber 19 of larger flow capacity than the slot.

Jar caps or covers $a$ are moved into operative relation to the die to receive the gaskets formed thereby by suitable means illustrated in part at the left of Fig. 1 and comprising generally a cup-shaped head 20 reciprocable axially toward and from the die and having associated therewith an ejector disk 21. 22 designates the lower end of a chute for delivering caps from a hopper (not shown), and 23 designates a part of means provided for supporting the caps in position to be engaged by the head 20 for movement by the latter into operative relation to the die.

A shearing sleeve 24 is provided on the exterior of the die, this sleeve being constantly reciprocated in the operation of the machine by suitable means of which I have shown in broken lines in Fig. 1 a bar 25 pivotally connected with the sleeve. It will be understood that the operation of the shearing sleeve 24 is timed with the rate of extrusion of the plastic material as well as with the cap presenting means to sever gaskets *b* periodically for application to caps *a* presented successively, all as set forth in said copending application. 26 designates generally a means for supplying a suitable lubricant to the exterior of the die to prevent the plastic material from adhering thereto through the operation of the shearing sleeve.

In practice the feed screw 7 must deliver plastic material to the interior of the die at a proper predetermined rate, and the material is forced through the die and its extrusion slot to form an annular radially extending ring which is to form a gasket upon each complete reciprocation of the shearing sleeve.

It is of primary importance in the formation of the gaskets that they be of substantially uniform width throughout their circumference, and it will be observed that since the width of the gasket at any point depends upon the rate of flow of the material at that point, it is essential not only that the head of the die be maintained in proper relation to the end of the tubular die member 12 but that the material have a uniform degree of plasticity.

To insure such uniform plasticity, I provide means for heating the material first as it passes through the feeding cylinder 6 and then again as it passes through the die, and I employ for this purpose electric heaters 27 and 28. The heater 27 comprises a spool 29 having radial side flanges so as to be of substantially channel form. This spool may be made in two sections together encircling the cylinder 6 between the supports 10 and 11, and is preferably made of metal. Within the spool is a liner 30 of suitable insulation material and the heating element is in the form of a wire 31 wound upon the spool so as to form a plurality of layers spaced apart by a sheet or sheets 32 of insulation material such as mica. The successive convolutions of the wire forming each layer are spaced apart slightly and held in such spaced relation by a suitable powdered material 33 (Fig. 2).

Around the outer layer of convolutions I provide a relatively thick layer of heat insulating material 34 with an enlargement or block 35 on its upper side shaped to form an electric receptacle to receive a plug 36 for connection with a suitable source of electric current, it being understood that the electric receptacle 35 provides connections with the ends of the heating elements in any suitable way. The outer layer 34 of insulating material may be clamped in position by means of a band 37 having at opposite ends lugs 38 suitably anchored at opposite sides of the block 35. The outer layer of insulating material tends to prevent loss of heat by outward radiation.

The heater 28 is similar in construction though smaller in size than the heater 27. As shown it is mounted on the tubular die member 12 near the rear end of the latter.

I have found that the electric heaters thus provided are especially adapted to insure the uniform plasticity of the material as the same is extruded. Of especial significance in this connection is the circular form of the heaters inasmuch as this causes an equal distribution of heat throughout the circumference of the channel through which the material passes; and in the case of the heater 28 on the die member 12 an even flow of heat occurs through the member 12 and the sleeve 15 closely interfitting therewith to the material as the same is being extruded.

Moreover, the metallic connecting webs 18 constitute a plurality of closely spaced heat-conducting elements whereby heat transmitted to the member 12 is conducted to the peripheral portion of the head forming the opposite wall of the extrusion slot. Such transmission of heat through the members 12, 15 and 18 is important in that the material as it passes through the ports 17 must merge in the annular channel 19 before extrusion from the slot 16. Thus by the construction provided the heat is applied to the material at the point of extrusion from the die, which is an important factor in insuring uniform extrusion and hence uniform width in the formation of the gaskets. The amount of heat supplied will, of course, vary with operating conditions, and after the machine has been in operation for a substantial amount of time the application of substantially less heat is required. The use of electricity thus lends itself readily to the application of the proper amount of heat and avoids the difficulty previously experienced with the use of steam or the like, due to its non-uniform character.

I claim as my invention:

1. A plastic ring extrusion device comprising, in combination, a tubular open ended die member, a sleeve screw-threaded into the end of said member and having a head spaced from the end of the member to form a die slot, said head having a metallic connection with the sleeve, and an electric heater encircling said tubular member, the heat from said heater being transmitted through the tubular member to said sleeve and said head.

2. A plastic ring extrusion device comprising, in combination, a tubular die member having an open end, a head having a metallic connection with the interior of said member and spaced from the end thereof to form an extrusion slot, and an electric heater encircling the tubular member and adapted to apply heat thereto for transmission to opposite walls of the slot, said connection between the head and the die member including a plurality of heat-conducting elements in closely spaced circumferential relation.

3. A plastic ring extrusion device comprising, in combination, a tubular member having an open end, a circular end member secured to said tubular member in spaced relation to said open end so as to form an extrusion slot, said end member having near its periphery a plurality of heat-conducting elements connected with said tubular member, and an electric heater encircling the tubular member and adapted to effect the transmission of heat uniformly to the material passing into said slot.

4. A plastic ring extrusion device comprising a tubular member having an open end, a sleeve fitting within said tubular member and having a head spaced from said open end, a series of circumferentially spaced ports in said sleeve, said head forming with the open end of the member an annular extrusion slot and an inner chamber communicating with the slot and of larger capacity than the slot, and a heater applied to the tubular member for effecting the transmission of heat therethrough to the material passing through said chamber and said slot.

5. A plastic ring extrusion device comprising, in combination, a cylinder having a feed screw rotatable therein, a tubular member in axial alinement with said cylinder and adapted to receive plastic material from the cylinder in the operation of the feed screw, a circular member adapted to form with said tubular member an extrusion slot, a heater encircling said tubular member, and means for conducting heat from said tubular member directly to said circular member at a point adjacent said slot.

6. A plastic ring extrusion die comprising, in combination, an open ended tubular member threaded internally at the open end, the edge of which forms one part of the die, a head closing the end of said member so as to leave a continuous slot about the surface thereof, said head having a threaded sleeve with a series of holes at the junction of the sleeve and head to provide communication between the slot and the tubular member, the parts forming the slot being recessed to provide internally of the slot a continuous space about the sleeve, and the radial flow capacity of the slot being less than the flow capacity of said series of holes.

7. A plastic ring extrusion device comprising, in combination, a tubular open ended member the end of which provides one side of a die slot, a head forming the other side of the die slot and having a sleeve secured in the tubular member, one of said die parts being recessed to provide a large continuous space within the slot, the portion of the sleeve adjacent said space being provided with a series of holes to provide communication between the slot and the tubular member, the flow capacity of the series of holes being greater than the flow capacity of the slot.

8. A die core having a head, and a sleeve of reduced diameter to be inserted in a hollow open ended magazine, said sleeve having a series of holes therethrough near the junction of the head and sleeve.

9. A die formed of two interfitting cylindrical parts each providing the side of an annular slot in the cylindrical surface, said parts being so formed as to provide an annular space inwardly of the slot having a large capacity, one part having a sleeve fitting into the other part, said sleeve having a series of holes therethrough communicating from the interior of the sleeve to said space.

10. An extrusion die comprising a tubular member, and a head having integral therewith a perforated annulus rigidly connecting the head to one end of said member in spaced relation thereto to form a substantially radial slot, said annulus being disposed adjacent the inner end of the slot.

11. In a device for extruding ring gaskets and the like, the combination of a tubular member adapted to contain a quantity of ring-forming material, a head, and a sleeve rigid with said head and fitting snugly within said tubular member with the head spaced a short distance from the end of the tubular member to form a die slot, said sleeve being perforated to permit the passage therethrough of said ring-forming material.

12. A ring extrusion die comprising, in combination, a hollow open-ended cylinder, a head spaced endwise from said cylinder to form an extrusion slot communicating at its inner end with said cylinder, and a plurality of supporting elements near the periphery of the head bridging said slot and rigidly secured to the cylinder adjacent the end thereof.

In testimony whereof, I have hereunto affixed my signature.

WILLIS J. PEELLE.